Jan. 10, 1939.     E. B. COWAN     2,143,594
PROCESS OF TREATING SUGAR JUICES
Original Filed Oct. 12, 1935
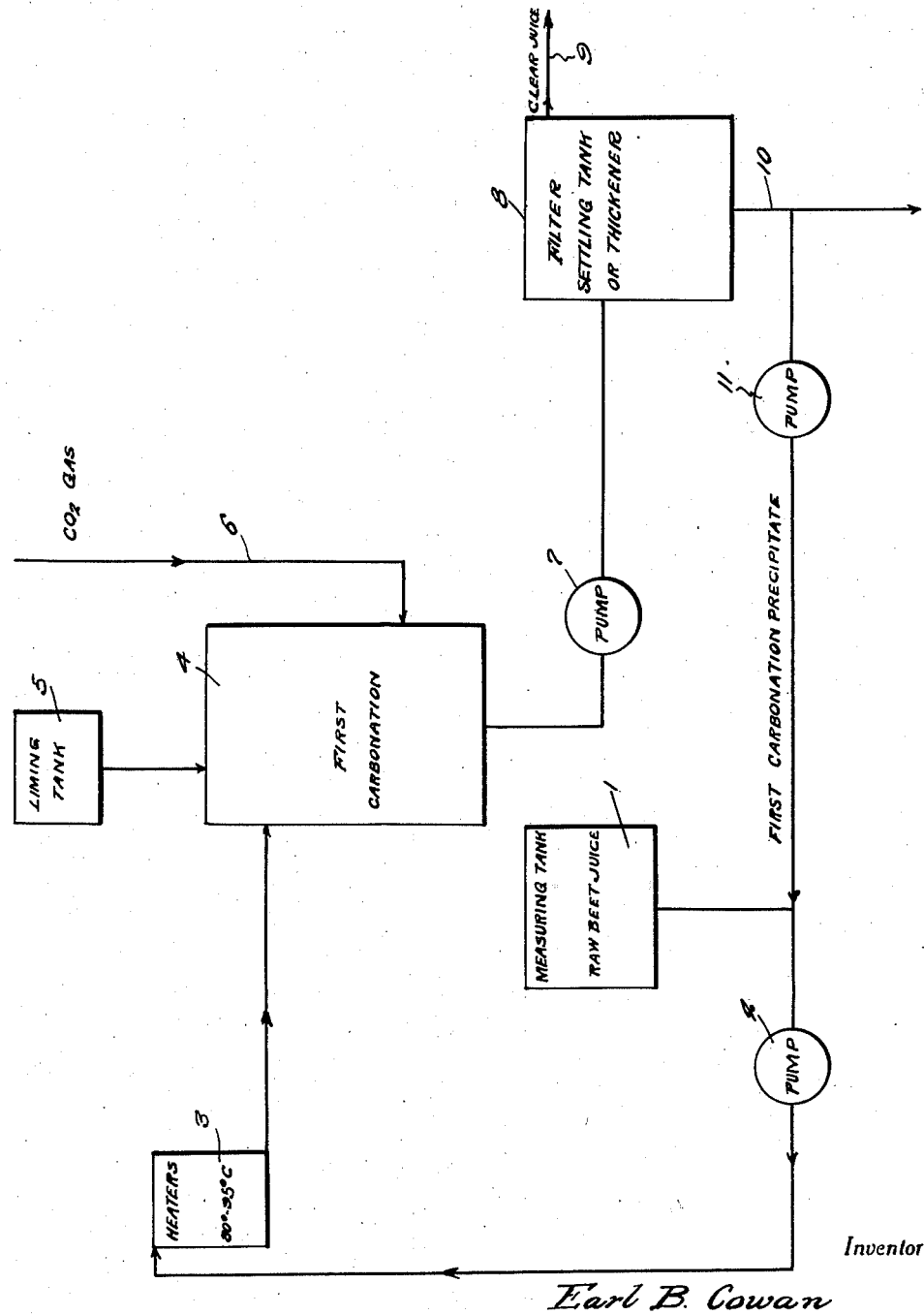
Inventor
Earl B. Cowan Patented Jan. 10, 1939

2,143,594

UNITED STATES PATENT OFFICE 2,143,594

PROCESS OF TREATING SUGAR JUICES

Earl B. Cowan, Grand Forks, N. Dak.

Application October 12, 1935, Serial No. 44,778
Renewed November 17, 1938

3 Claims. (Cl. 127—50)

My invention relates generally to a process of treating sugar juices, and particularly sugar juices extracted from sugar beets, and an important object of the invention is to provide for treating such juices for defecating the same at a very substantial saving in the amount of lime used, and in the amount of fuel usually required in the evaporating steps.

Another important object of the invention is to provide a process of the character described above in which the carbonation operations may be performed continuously or by batches or by batch fractioning, and wherein the resultant cake at the filters is very compact but porous and washes with approximately one-half of the usual amount of water required in present processes of this character.

Another important object of the invention is to provide in a process of the type indicated, means for procuring positive elimination of the foam usually caused by the mixing of basic lime with acid juice in the first carbonation.

Other important objects of my invention will be apparent from a reading of the following description in connection with the drawing, wherein for purpose of illustration I have shown apparatus suitable to the carrying out of the process of the invention.

In the drawing:—

The single view is a diagrammatic representation of apparatus suitable to the carrying out of the process of the invention.

The invention contemplates a method or process producing facilitation of the filtration of first carbonation juice and of the subsequent washing of the first carbonation precipitate free from sugar.

In treating sugar juice, extracted from sugar beets, it has been the common practice to first heat the raw beet juice to a temperature ranging from 80 to 95 degrees C., and then to add an oxid or hydroxid of lime so as to coagulate and precipitate organic impurities. This is usually followed by first carbonation, in which the alkalinity of the mixture is reduced by the introduction of $CO_2$ gas. The resultant mixture is then pumped to the filters, where the lime in the form of carbonate, some oxid, and hydroxid, plus impurities and some sugar, are removed as cake. This lime cake is then washed with water to free it from the sugar which it contains. The use of this method of coagulating and precipitating the impurities in the raw beet juice often results in a finely divided slimy poor filtering precipitate, from which the sugar is washed with great difficulty, and a large amount of water must needs be used. This large amount of water dilutes the juice and must be evaporated at great expense. The process of the present invention, conducted with conventional apparatus such as may be at hand, produces an excellent and easily worked cake, which requires only a fraction of the amount of water to wash the same which would otherwise be required.

The present invention contemplates separating the precipitate of the first carbonation from the juice by means of a filter, a settling tank or thickener; removing the clear juice and returning to the raw beet juice just extracted from the beets, such a portion of the unrefined precipitate that the alkalinity of the mixture will range from .010 to .030 gram of lime per 100 ml. Such returned precipitate being basic, neutralizes the acid raw beet juice, then, when heated to a temperature ranging between 80 and 95 degrees C. acts as a nucleus for the floc formed by the defecation of the juice in the first carbonation and causes a granular precipitate which filters and washes more efficiently than the ordinary cake obtained by conventional processes. The cake formed at the filters from this precipitate is very compact, although decidedly porous.

The filtering capacity is, therefore, greatly increased and because the cake is easily washed free from sugar, dilution of the final juice is greatly decreased. In actual performance of the process it is noted that the amount of water required for washing was cut to about one-half the amount of water required when performing the conventional processes, while the sugar losses on the lime cake were also noticeably reduced.

It is also noted that when the herein described improved process is used, a saving of about one-third is made in the amount of lime introduced as CaO or hydroxid, at the first carbonation, for the reason that the acid raw beet juice is neutralized by the unrefined first carbonation precipitate before it comes in contact with the lime used at the first carbonation.

The present process also presents the juice from foaming in the first carbonation, the said foam being formed when the acid raw beet juice comes in contact with the first carbonation precipitate. This foam according to the present process is broken up by using a centrifugal pump 2 for pumping the mixture through the heaters to the first carbonation; so that little or no oil or foam breaker is required.

Actual performance of the process has shown that approximately 50% of the unrefined first carbonation precipitate must be returned for best results when using 2% of lime as CaO or hydroxid, on the raw beet juice at the first carbonation.

The volume of the precipitate to be returned is, therefore, variable according to the acidity of the raw beet juice and the amount of lime introduced as CaO or hydroxid in the first carbonation.

Operation of the process may be exemplified as follows:—

The raw beet juice designated by the numeral 1 is pumped from the measuring tank by the pump 2 through the heaters 3 where it is heated to a temperature ranging between 80 and 95 degrees C. and then passes on to the first carbonation 4 where the lime, in the form of CaO or hydroxid 5 is added.

It is at this point that the juice is carbonated by the $CO_2$ gas 6 and is then pumped by the pump 7 to the filter, settling tank, or thickener 8. The clear juice 9 is here drawn off or passes on.

The procedure outlined above is well known and has heretofore been employed in the treating of raw beet juice. It has been found that where this process or procedure is used without modification such as is present in the present process, the precipitate formed is finely divided, slimy and difficult to filter. The improvement of the present process resides in the steps of returning a portion of the unrefined first carbonation precipitate to the raw beet juice and heating the mixture at a temperature ranging between 80 and 95 degrees C., before carbonation.

The separated first carbonation precipitate, from the filter, settling tank, or thickener 8 is indicated by the numeral 10. This separated material leaves the filter or the equivalent 8 as a thick sludge of 40–60 Brix hydrometer sugar scale reading. A portion, the amount to be determined by actual experiment, but which is ordinarily about 50% of the first carbonation precipitate when 2% of lime is used in the raw beet juice at carbonation, is conveyed by means of the pump 11 to the raw beet juice 1 flowing from the measuring tank. No mixing apparatus is needed because the pump 2 has sufficient agitating effect.

When the pump 2 is of the centrifugal type, which is recommended herein, and which are now the type of pumps most commonly in use in apparatus of this character, it breaks up all of the foam caused by the reaction at the meeting of the basic sludge and the acid juice, so as to eliminate foam in the first carbonation.

Amplifying the disclosure made above, it is further stated that the steps of the present process include first the addition of the first carbonation precipitate to the raw beet juice which has been separated from the first carbonation juice by either settling or by some suitable mechanical means, depending upon the type of equipment on hand for first carbonation filtration.

Then the first carbonation precipitate, in the form of a sludge, ranging 40 to 60 Brix sugar scale hydrometer reading, is pumped, without refining or alteration in any way, into the raw juice. The sludge entering the raw juice immediately in advance of the raw juice pump, is pumped through the heater to the first carbonation. Just enough of the first carbonation precipitate is added to the raw juice to make it slightly alkaline so as to test between .010 and .030 gram of lime per 100 ml. The reaction of the addition of the alkaline sludge on the acid raw juice has been explained. First, the raw juice is neutralized, then made slightly alkaline in the form of CaO or carbonate, by the first carbonation precipitate.

The mixture, after passing the pump and upon being heated to between 80 and 95 degrees C., forms a flaky floc which acts as a seed for the precipitation in the first carbonation.

After the mixture passes the heaters 3 it goes to the first carbonation 4 where the lime in the form of CaO or hydroxid, is added. A feature of the present process is that it is not restricted to any particular type of carbonation and any equipment on hand may be utilized and the process performed continuously or by batch.

Another feature of the present invention is the adding of the precipitate to the raw juice in advance of the pump, providing the pump is of the centrifugal type now commonly in use, which eliminates the foam resulting from the mixing of the lime with the acid raw juice at first carbonation. It will be understood that the foam is caused by the gases arising when the acid and alkaline materials react. Consequently, no foam is made when the lime and CaO is added to the mixture in the carbonation.

Although I have shown and described herein a preferred embodiment of my invention, it is to be definitely understood that I do not desire to limit the application of the invention thereto, and any change or changes may be made in the materials, and in the steps and operations of the process, within the spirit of the invention and the scope of the subjoined claims.

First carbonation referred to in the following claims to be defined as raw juice plus any sugar from any other source limed by CaO or hydroxid and gassed by $CO_2$ gas.

What is claimed is:

1. A process of the character described consisting of heating the raw beet juice at a temperature ranging between 80° and 95° C., then adding thereto about 2% of lime, then subjecting the resultant to $CO_2$ gas, then separating the resultant into unrefined precipitate and clear juice, then returning about 50% of the unrefined precipitate to the raw beet juice and heating the resultant mixture at a temperature ranging between 80° and 95° C.

2. A process of the character described consisting of heating the incoming raw beet juice at a temperature ranging between 80° and 95° C., then adding lime thereto, then separating the resultant into unrefined precipitate and clear juice, then returing about 50% of the unrefined precipitate to the incoming raw beet juice so that the mixture has an alkalinity ranging between .010 to .030 gram of lime per 100 ml., then heating the resultant at a temperature ranging between 80° and 95° C.

3. A process of the character described consisting of heating the incoming raw beet juice at a temperature ranging between 80° to 95° C., then adding thereto about 2% of lime, then separating the resultant into unrefined precipitate and clear juice, then returning about 50% of the unrefined precipitate to the incoming raw beet juice so that the mixture has an alkalinity ranging between .010 and .030 gram of lime per 100 ml., then heating the resultant to a temperature ranging between 80° and 95° C.

EARL B. COWAN.